Jan. 7, 1969  D. A. JENSEN  3,420,564
HAY BALE LOADER AND STACKER ATTACHMENT
Filed Aug. 12, 1966  Sheet 3 of 3
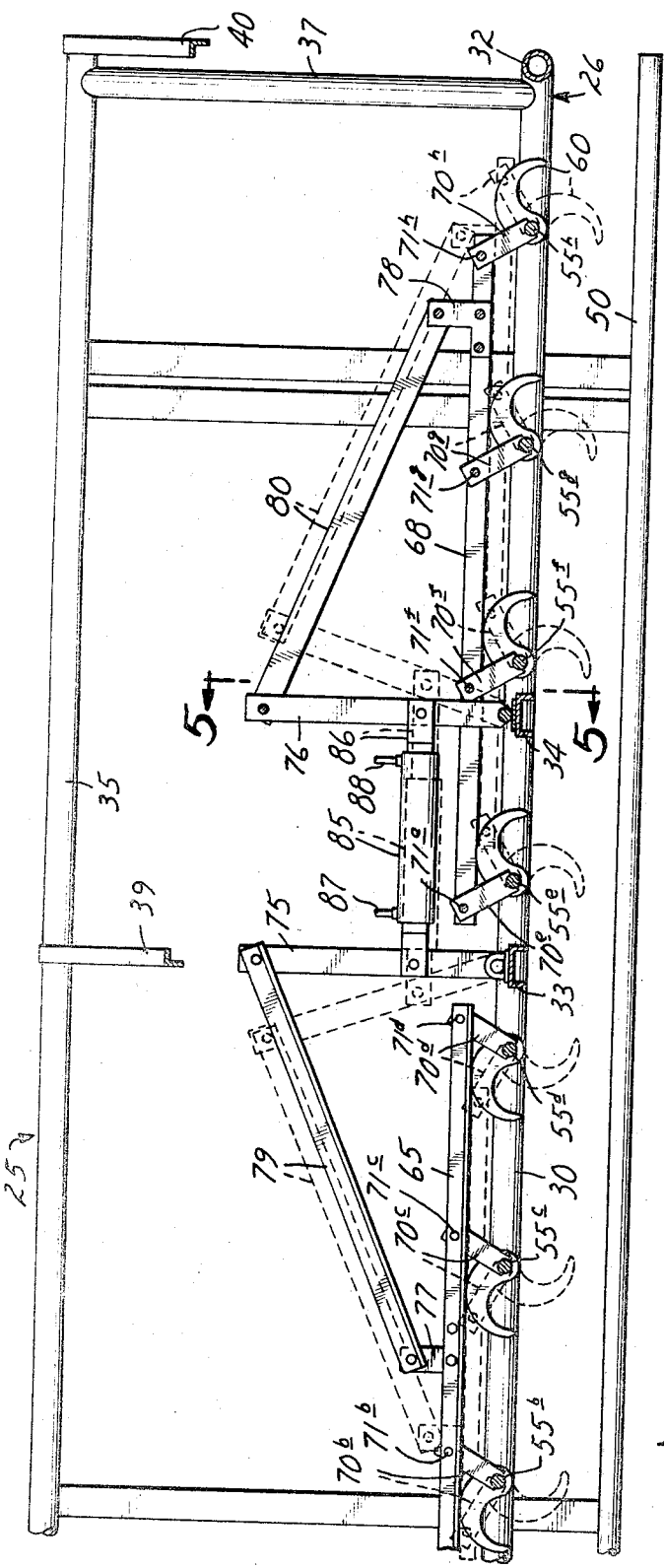
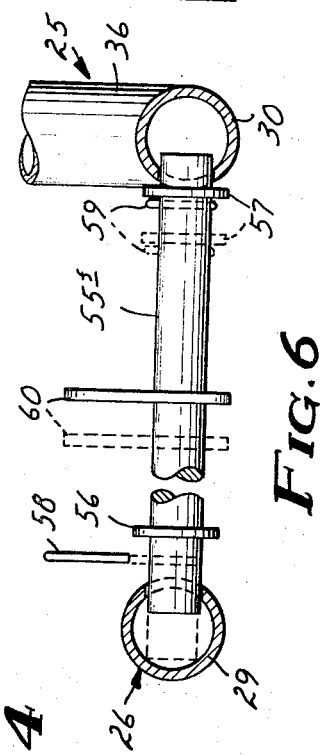
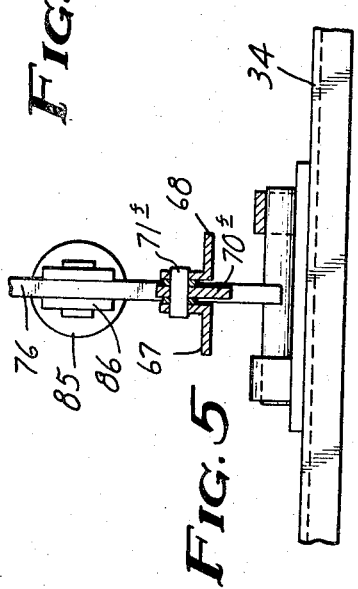
INVENTOR.
DOYNE A. JENSEN
BY Merchant & Gould
ATTORNEYS

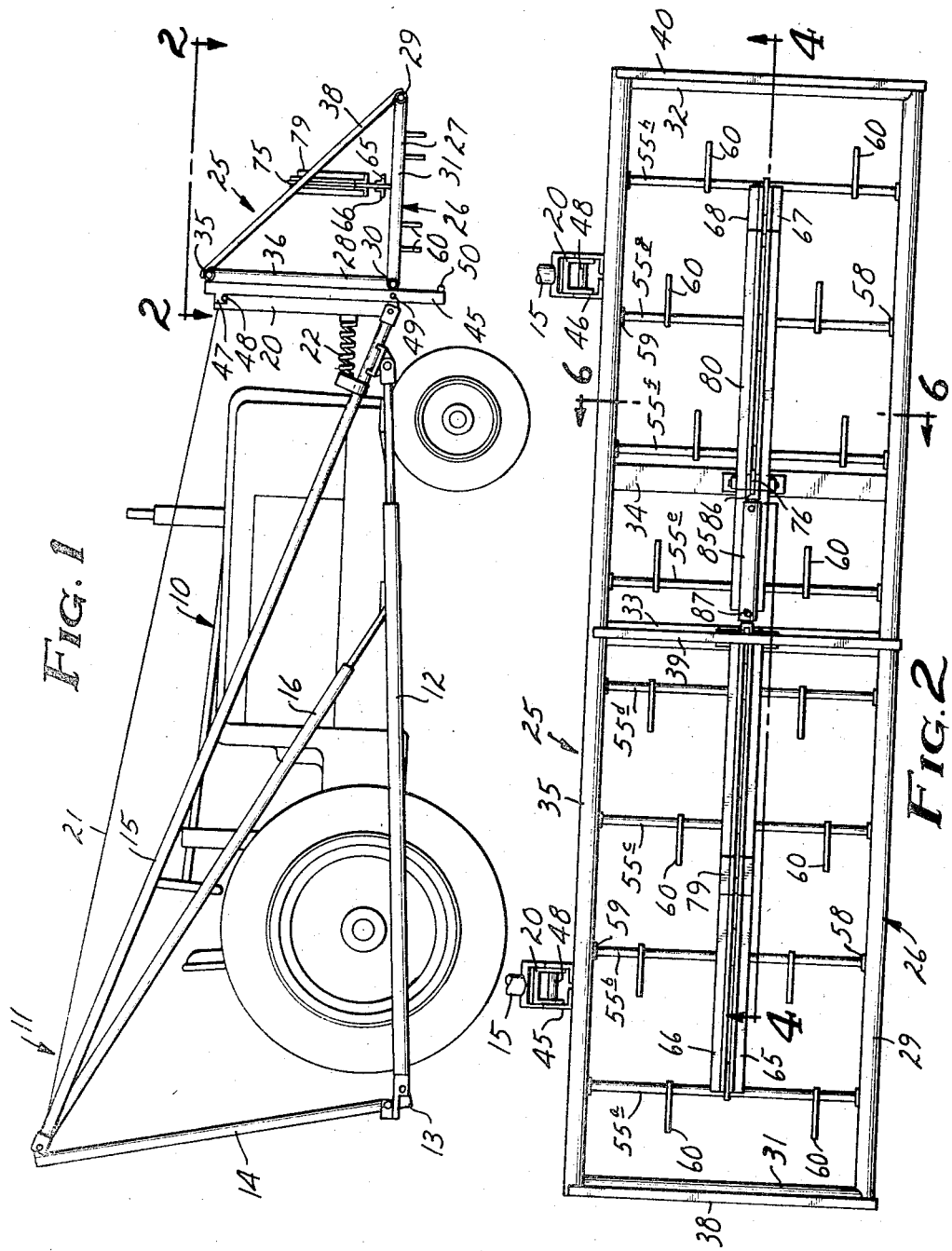

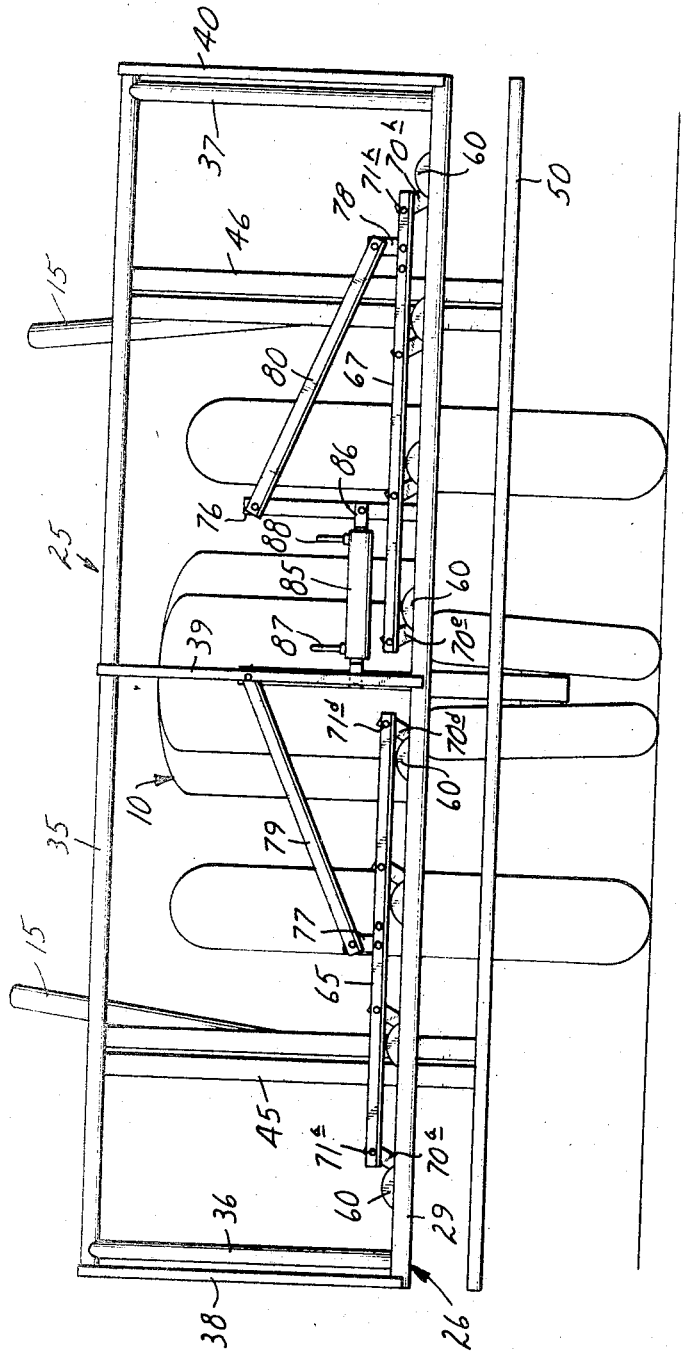

3,420,564
HAY BALE LOADER AND STACKER ATTACHMENT
Doyne A. Jensen, Frederick, S. Dak. 57441
Filed Aug. 12, 1966, Ser. No. 572,068
U.S. Cl. 294—67
Int. Cl. B66c 3/04; B66c 1/10
4 Claims

ABSTRACT OF THE DISCLOSURE

A hay bale loader and stacker capable of picking up a large number of bales and compressing them in four directions so that they may be tightly stacked. A frame is mounted longitudinally to the direction of motion of a supporting tractor and has a bumper bar so that the tractor may compress the bales in a first two directions, and a plurality of transverse members with tines mounted on the frame, and those at each end rotated toward each other to grab and compress the bales in a second two directions.

---

This invention pertains to an improvement in bale loader and stacker attachments and more particularly to a highly maneuverable attachment for raising bales of material, such as hay and the like, from the ground or a load and placing them in a tight stack.

Bale loaders and stackers utilizing hydraulic means to activate rotatably mounted bale energizing tines are well known in the art. However, in all of these prior art devices, see especially the C. W. Pridgeon, "Bale Loader and Stacker," Patent No. 2,962,177 and W. V. Stimpson, "Hay Loader," Patent No. 2,734,646, the tines engage the bales of hay in such a fashion that unless the bales are accurately positioned prior to engagement of the tines, the devices cannot be utilized to their full capacity. Also, there is no means for forcing the bales together. Thus, if the bales are loosely positioned relative to each other when these prior art devices pick them up and transfer them to a stack, they will be loosely positioned in the stack. Loose stacks are undesirable since forms of moisture, such as snow, rain, etc., can enter the stack and damage the material.

In the present device a frame having rotatably mounted tines thereon is attached to a tractor by a standard lift mechanism or the like. The tines are positioned so that they rotate about axes perpendicular to the direction of movement and toward the center of the device when they engage bales. A first group of tines rotate in one direction toward the center of the device to engage bales while a second group rotates in the opposite direction. This simultaneous rotation of the two groups of tines toward each other produce a grasping movement which tends to force the bales tightly together. Thus, the tines can be utilized to force bales into juxtaposition prior to actually picking them up so that the present device forms the bales into a tight stack and it can be utilized to its full capacity. In addition, the present device includes a bale alignment guide for moving the bales horizontally in the direction of movement of the tractor. Thus, the bales can be manipulated into rows through use of the alignment guide and the tines so that the present device can generally engage and raise its full capacity. In addition to the above mentioned advantages the present device is simple to construct with less moving parts and extremely easy to operate.

It is an object of the present invention to provide a new and improved bale loader and stacker attachment.

It is a further object of the present invention to provide a bale loader and stacker which can be utilized to manipulate bales prior to picking them up for optimum positioning of the bales to form tight stacks and to utilize the attachment at its maximum capacity.

It is a further object of the present invention to provide a bale loader and stacker attachment which is inexpensive to produce and simple to operate.

These and other objects of this invention will become apparent to those skilled in the art upon consideration of the accompanying specification, claims, and drawings. Referring to the drawings, wherein like characters indicate like parts throughout the figures:

FIGURE 1 is a side view of the present device attached to a tractor;

FIGURE 2 is an enlarged top view as seen from the line 2—2 in FIGURE 1;

FIGURE 3 is an enlarged front view of the present device attached to a tractor;

FIGURE 4 is an enlarged sectional view as seen from the line 4—4 in FIGURE 2;

FIGURE 5 is an enlarged sectional view as seen from the line 5—5 in FIGURE 4; and FIGURE 6 is an enlarged sectional view as seen from the line 6—6 in FIGURE 2.

In the figures the numeral 10 designates a tractor having a lift mechanism generally designated 11 fixedly attached thereto and a hydraulic system, now shown. The lift mechanism 11 may be any of the standard types and in the illustrations it includes a pair of generally horizontal elongated hydraulic cylinders and pistons 12 extending from a fixedly positioned transverse brace 13 at the rear of the tractor to a variable distance generally in front of the tractor. A generally triangularly shaped structure is formed on either side of the tractor 10 by braces 14 extending vertically upwardly from the rear brace 13 and braces 15 extending from the upper ends of the braces 14 somewhat past the forwardmost ends of the hydraulic cylinders and pistons 12. The forwardmost end of each of the pistons in the hydraulic cylinders 12 are pivotally attached to the braces 15 and the rearmost ends of the hydraulic cylinders 12 are pivotally attached to the brace 13. Also, the braces 13, 14, and 15 on each side are pivotally attached together at the junction points so that as the pistons in the hydraulic cylinders 12 are forced outwardly, the forewardmost ends move upwardly and vice versa. A second pair of hydraulic cylinders 16 on either side of the tractor 10 extend from the upper ends of the braces 14 forwardly and the forward end of the pistons are attached to either side of the tractor 10. Thus, as the pistons in the cylinders 16 are moved inwardly or outwardly the braces 14 are forced forwardly or rearwardly, which in turn causes the front ends of the braces 15 to move forwardly or rearwardly. The forwardmost end of each of the braces 15 are bifurcated and each of the branches are separated sufficiently for the lower ends of a pair of channel irons 20 to be pivotally attached therein. The upper ends of the channel irons 20 are connected to the upper ends of the braces 14 by a pair of cables 21. The cables 21 are connected to the braces 14 so that they can be lengthened or shortened to maintain the channel irons 20 generally vertical. A pair of springs 22 are attached to the braces 15 adjacent the front ends thereof and butt against the rear edges of the channel irons 20 to prevent rearward rotation thereof past the vertical and to act as a partial shock absorber.

The bale loader and stacker attachment generally designated 25 includes a frame 26, which in this embodiment is constructed of some heavy material such as pipe or the like. The frame 26 extends longitudinally perpendicular to the direction of movement of the tractor 10 and has a generally horizontal portion 27 and a generally vertical portion 28. The horizontal portion 27 of the frame 26 is generally rectangular in shape with a front and rear side member 29 and 30 respectively. The front and rear side members 29 and 30 are connected by end members 31 and 32 and by a pair of channel irons 33 and 34. Channel iron 33 extends between the side members 29 and 30 at approximately the longitudinal center of the frame 26 and the channel iron 34 is parallel and spaced to the right thereof, as viewed in FIGURES 2 and 4. The vertical portion 28 of the frame 26 includes an upper side member 35 spaced vertically above the rear side member 30 by a pair of end members 36 and 37. Three braces 38, 39, and 40 formed from some rigid material, such as angle iron or the like, extend between either end and the center of the upper side member 35 and the front side member 29 to add rigidity to the frame 26. All of the members of the frame 26 are connected together by welding in this embodiment. However, it should be understood that any convenient method including bolts, rivets, pins, etc., might be utilized.

In this embodiment the frame 26 is attached to the lift mechanism 11 in the following fashion. Two pairs of angle irons 45 and 46 are attached vertically between the upper side member 35 and the rear side member 30 to form channels spaced apart a sufficient distance to receive the two channel irons 20 of the lift mechanism 11 therein. Each of the angle irons of the two pairs 45 and 46 have an ear 47, one of which can be seen in FIGURE 1, extending rearwardly adjacent the upper end thereof. The two channels 20 on the lift mechanism 11 each have a pin 48 fixedly attached therein adjacent the upper end, which extend outwardly from either side in a horizontal position. When the channel irons 20 are engaged in the channels formed by the pairs of angle irons 45 and 46, the pins 48 engage a slot in the lower edge of the ears 47 and maintain the frame 26 firmly engaged on the lift mechanism 11. To prevent the ears 47 from becoming disengaged from the pins 48, through relative upward movement of the attachment 25, a pair of pins 49 are inserted, through each of the pairs of angle irons 45 and 46 and the channel irons 20 engaged therein, adjacent the lower end of the channel irons 20. Thus, the frame 26 is quickly and easily engaged or disengaged from the lift mechanism 11. The pairs of angle irons 45 and 46 extend downwardly somewhat below the horizontal portion 27 of the frame 26 and a bale alignment guide 50, which extends longitudinally the length of the frame 26, is fixedly attached to the lower ends thereof. In this embodiment the alignment guide 50 is simply a piece of pipe. However, it should be understood that it could be provided in a variety of embodiments, such as a framework of horizontal and vertical members, and it would still be within the scope of this invention.

The horizontal portion 27 of the frame 26 has eight transverse members 55a–h parallel to and equally spaced between the end members 31 and 32. In FIGURE 2 the transverse members 55a–h are numbered from the left end 31 to the right end 32. In this embodiment each of the transverse members 55a–h is a cylindrical rod pivotally mounted by inserting the front end thereof in an opening with a slightly larger diameter in the front side member 29 and the rear end in an opening with a slightly larger diameter in the rear side member 30. The transverse members 55a–h are each prevented from moving longitudinally by means of a pair of washers 56 and 57 coaxially positioned thereover at either end thereof adjacent the front and rear side members 29 and 30 and a pair of cotter pins 58 and 59 inserted through openings in each transverse member 55a–h adjacent the inner surfaces of the washers 56 and 57. As illustrated in FIGURE 6 the transverse member 55f can be quickly and easily removed from the horizontal portion 27 of the frame 26 for repair or replacement by removing a cotter pin 58 and sliding the transverse member 55f longitudinally into the front side member 29 to remove the opposite end thereof from the rear side member 30. The transverse member 55f can then be removed from any opening in the front side member 29 by moving it longitudinally in the other direction.

Each of the transverse members 55a–h has a pair of arcuately curved tines 60 fixedly attached thereto in a spaced apart relationship. All of the tines 60 attached to the transverse members 55a–h are positioned so that the free or lower ends curve inwardly toward the longitudinal center of the frame 26. Also, the tines 60 on a specific transverse member 55 are spaced apart a sufficient distance so that each tine 60 engages a separate bale. The transverse members 55a–h are spaced apart a sufficient distance so that the first two transverse members 55c–d and 55e–f, positioned on either side of the longitudinal center of the frame 26, each engage two bales lying with their ends together at the longitudinal center and their sides together at approximately the transverse center of the horizontal portion 27 of the frame 26. The outermost two transverse members 55a–b and 55g–h, positioned on either side of the longitudinal center of the frame 26, each engage two more bales positioned with their ends against the ends of the inner bales and their sides together at approximately the transverse center of the horizontal portion 27 of the frame 26. Thus, in the present embodiment, the tines 60 and the transverse members 55a–h are positioned so that the attachment 25 can engage and raise eight bales simultaneously.

Referring to FIGURES 2, 3, and 4, a generally horizontal assembly, including a pair of angle irons 65 and 66, is positioned relative to the transverse members 55a–d in a perpendicular relationship approximately over the center of the four transverse members 55a–d and spaced therefrom. A second generally horizontal assembly, including a pair of angle irons 67 and 68, is positioned relative to the transverse members 55e–h in a perpendicular relationship approximately over the center of the transverse members 55e–h and spaced therefrom. Each of the angle irons in the pairs of angle irons 65–66 and 67–68 are positioned, relative to each other, so that a flat outer surface is directed downwardly and the other flat outer surface is parallel with, but spaced from, the similar surface of the mating angle iron. The angle irons 65–66 are connected to each of the transverse members 55a–d by four linking members 70a–d. One end of each of the linking members 70a–d is positioned between the angle irons 65–66 and pivotally engaged therein by means of pins 71a–d. The other end of the linking members 70a–d is fixedly attached to transverse members 55a–d, respectively, by some means such as welding or the like. The linking members 70a–d are connected to the transverse members 55a–d, with respect to the tines 60, so that movement of the angel irons 65–66 to the right in the FIGURES 2 through 4, raises the ends of the tines 60 above the lower edges of the horizontal portion 27 of the frame 26 and movement of the angle irons 65–66 to the left rotates the tines 60 downwardly to the position illustrated in dotted lines in FIGURE 4. In a similar fashion the angle irons 67–68 are attached to the transverse members 55e–h by means of four linking members 70e–h and four pins 71e–h.

Each of the channel irons 33 and 34 in the horizontal portion 27 of the frame 26 has one end of a generally vertical member 75 and 76, respectively, pivotally attached to the upper surface thereof at approximately the center. Because the channel iron 34 is located to the right of the longitudinal center of the frame 26, the vertical member 76 extends upwardly between the angle irons 67 and 68, however, it does not contact them at that point. Each of the horizontal assemblies 65–66 and 67–68 have an L-shaped member 77 and 78, respectively, fixedly attached therebetween by bolts or the like so that one arm extends vertically upward above the upper edge thereof. A first linking member 79, consisting of a pair of back to back angle irons spaced apart to receive vertical member 75 and L-shaped member 77 therebetween is pivotally connected at one end to the upper end of the vertical member 75 and at the other end to the vertically extending arm of the L-shaped member 77. A second linking member 80, similar in construction and length to the the linking member 79, is pivotally connected at one end to the upper end of the vertical member 76 and at the other end to the vertically extending arm of the L-shaped member 78. A reversible force producing means, which in this embodiment consists of a hydraulic cylinder 85 and piston 86, is pivotally connected to the vertical members 75 and 76 for pivoting those members approximately equally about their pivotal connections on the channel irons 33 and 34. The free end of the cylinder 85 is pivotally attached to the vertical member 75 a predetermined distance from the pivotal connection of the vertical member 75 to the channel iron 33, and the free end of the piston 86 is connected to the vertical member 76 approximately the same distance from its pivotal connection to the channel iron 34. As will be seen presently, the position at which the cylinder 85 and the piston 86 are connected to the vertical members 75 and 76 is somewhat important since it determines the amount of movement required by the piston 86 within the cylinder 85 to rotate the tines 60 the desired amount. The piston 85 has a pair of inputs 87 and 88 adapted to be connected to the hydraulic system of the tractor 10, which inputs cause the piston 86 to move to the right or the left, respectively, within the cylindler 85.

In the operation of the present device, fluid from the hydraulic system of the tractor 10 is pumped into the inlet 88 of the cylinder 85 until the piston 86 is in the normal or inward position. At this time the vertical members 75 and 76 are in their upright position, as illustrated in full lines in FIGURE 4, and the horizontal assemblies, angle irons 65–66 and 67–68 are moved to a position in which the tines 60 are above the lower edges of the horizontal portion 27 of the frame 26, as illustrated in full lines in FIGURE 4. The entire attachment 25 is then manipulated, through use of the lift mechanism 11, into position over a plurality, generally 8, of bales. In this manipulation of the attachment 25, the bale alignment guide 50 butts against the sides of the bales and, through force produced by the tractor 10 or the lift mechanism 11, the bales are forced into tight side by side relationship. The hydraulic cylinder 85 and piston 86 may then be activated to cause the tines 60 to rotate downwardly and force the bales into tight end to end abutment. If there are relatively large gaps between the ends of the bales, the input 87 and the input 88 of the hydraulic cylinder 85 may be alternately activated to cause the vertical members 75 and 76 to move from the full line position to the dotted line position and back to the full line position several times (dotted and full-line positions are illustrated in FIGURE 4) which in turn causes the tines 60 to move from the full line position downwardly to the dotted line position and then back to the full line position, as illustrated in FIGURE 4. This alternate downward and upward rotating movement of the tines 60 causes the bale to be moved inwardly into tight end to end abutting relationship. Once the bales are in tight abutting relationship end to end and side to side, the tines 60 are moved downwardly into engagement with the bales and the bales are raised and placed in a desired stack or load. Because the bales can be moved into tight end to end abutting relationship by the movement of the tines 60 and can be forced into tight side by side relationship by the force of the lift mechanism 11 or the tractor 10 on the bale alignment guide 50, the bales can be formed into a very tight stack in which there are no openings between bales to allow moisture, such as snow, rain, etc., to enter.

While I have shown and described a specific embodiment of this invention, further modifications and improvements will appear to those skilled in the art. I desire it to be understood, therefore, that this invention is not limited to the particular form shown, and I intend in the appended claims to cover all modifications which do not depart from the spirit and scope of this invention.

I claim:

1. A baler loader and stacker attachment for compacting bales in first and second directions comprising:
   an elongated frame having a plurality of parallel transverse members pivotally mounted therein for rotation about axes perpendicular to the longitudinal direction of the frame,
   a plurality of tines fixedly attached to said transverse members for rotation therewith, said plurality of parallel transverse members formed of two groups, the first group of said parallel transverse members mounted on the elongated frame between the center and first end of said frame,
   the second group of said parallel transverse members mounted on the elongated frame between the center and the second end of the elongated frame,
   the tines on the first and second group of parallel transverse members are curved so that the tines of the first group curve toward the tines of the second group when in the pick-up position to compress the bales in a first direction,
   a longitudinal bumper attached to the said elongated frame below its main structure to aid in positioning and compressing the bales in a second direction transverse to the first direction, and
   driving means attached to said first and second groups of parallel transverse members to rotate them so that the first and second group rotate in opposite directions.

2. Apparatus according to claim 1 comprising:
   a first linkage operatively associated with the first group of transverse members,
   a second linkage operatively associated with the second group of transverse members, and
   said driving means attached to the first and second linkages to control and move the first and second group of parallel transverse members.

3. Apparatus according to claim 2 wherein the driving means is a hydraulic cylinder.

4. Apparatus according to claim 3, control means for remotely controlling the position of the driving means to selectively position the tines on the longitudinal members.

References Cited

UNITED STATES PATENTS

| | | | |
|---|---|---|---|
| 2,734,646 | 2/1956 | Stimpson | 214—147 |
| 2,962,177 | 11/1960 | Pridgeon | 214—147 |
| 3,319,813 | 5/1967 | Beyea | 214—147 |

HUGO A. SCHULZ, *Primary Examiner.*

U.S. Cl. X.R.

214—147; 294—88, 98